United States Patent [19]
Smith

[11] Patent Number: 5,285,953
[45] Date of Patent: Feb. 15, 1994

[54] BEVERAGE CUP HOLDER

[76] Inventor: Robert B. Smith, 11731 Parks Farm La., Charlotte, N.C. 28277

[21] Appl. No.: 52,770

[22] Filed: Apr. 26, 1993

[51] Int. Cl.$^5$ .............................................. B65D 90/12
[52] U.S. Cl. ................................ 229/1.5 H; 220/737; 220/738
[58] Field of Search ............... 220/737, 738, 408, 903; 229/1.5 H

[56] References Cited
U.S. PATENT DOCUMENTS

| | | | |
|---|---|---|---|
| 1,334,342 | 3/1920 | Woods | 220/737 |
| 2,329,512 | 9/1943 | Clifford, Jr. | 229/1.5 H |
| 3,285,456 | 11/1966 | Dewitt | 220/903 X |
| 4,720,023 | 1/1988 | Jeff | 220/903 X |
| 4,854,468 | 8/1989 | Dahlquist et al. | 215/100 R X |
| 4,928,848 | 5/1990 | Ballway | 220/737 X |
| 5,040,719 | 8/1991 | Ballway | 220/738 X |

Primary Examiner—Steven M. Pollard
Attorney, Agent, or Firm—Judith E. Garmon

[57] ABSTRACT

A cup holder includes a movable adapter ring for use in selectively reducing the inner diameter of the larger upper socket that is the primary cup support. The large upper socket is movably secured to an underlying base member having an outer diameter sufficient to securely fit into the stationary cup holders found in most late model vehicles. The upper socket is movable in a lateral direction to accommodate use of two such supports in vehicle that provide two adjacently positioned cup holders.

6 Claims, 4 Drawing Sheets

BEVERAGE CUP HOLDER

BACKGROUND AND SUMMARY OF THE PRESENT INVENTION

As evidenced by the addition of beverage cup holders in almost all late model vehicles, there is an increased need for such devices by a public who frequently eat and drink while traveling. Most are stationarily positioned and accommodate containers of relatively small outer diameters, generally that of a conventional canned beverage. Unfortunately, however, other beverage containers are of many sizes, frequently of large diameter. Additionally, where two cup holders are provided in a center console in a vehicle, generally they are so closely adjacent each other that it is impossible to accommodate large-diameter containers.

A search of the prior art reveals great activity in this area; most patents being directed to devices for insertion into existing cup holders to increase the size. None, however, are adequately designed to accommodate a variety of sizes and to be laterally adjustable for use in adjacently positioned, stationary cup holders.

U.S. Pat. No. 5,008,673 teaches an adapter device having a large diameter cup holder with a small diameter pedestal to fit the pre-existing holder.

U.S. Pat. No. 5,135,195 teaches an adapter with varying notches to accommodate cup or mug handles, and an inner, flexible flange for securing smaller cups.

U.S. Pat. Nos. 5,174,534 and 4,088,250 teach multi-part adapters; and U.S. Pat. No. 4,854,468 teaches a base member with a truncated support member.

While it is readily apparent that there is a great variety of types of holders, none is a unitary member, adjustable laterally for position and internally for diameter.

The present invention overcomes many of the disadvantages of the prior art in that the device is designed and structured to adjust to cups of various sizes, and with a laterally movable, cup-receiving socket so that a pair of the devices can be used in closely adjacent stationary cup holders.

The preferred embodiment of the present invention includes a base portion formed of heavy, molded rubber or rubber-like material, having a substantially tubular configuration and an outer diameter enabling a secure fit within an existing cup holder. The tubular base member has a closed upper end, on top of which a socket-type cup-holder is mounted.

As will be described in more detail below, the upper socket includes an inner adapter ring for changing the diameter; and the attachment of the socket to the base includes a slide means for moving the socket in either lateral direction to adjust the center of the socket relative to the base.

A study of the detailed description in conjunction with the accompanying drawings will reveal that the present invention provides a highly improved device for adapting existing cup holders to hold a variety of cups. It should be understood that while the present description is directed to use of the device in existing vehicle cup holders it is not meant to be limiting and the device may readily be used in other types of cup holders or supports.

DETAILED DESCRIPTION OF A PREFERRED EMBODIMENT

Figure 1:
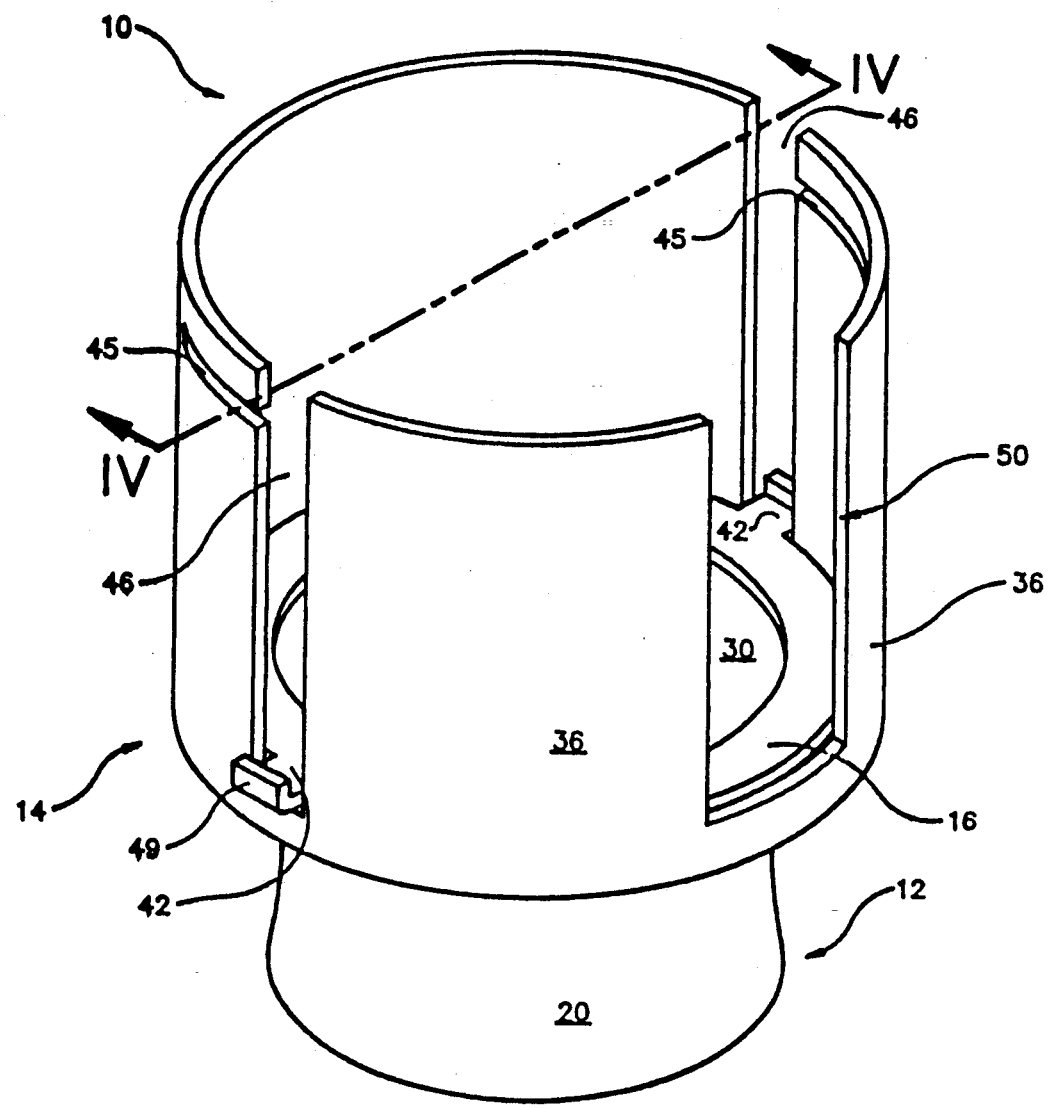
FIG. 1 is a perspective view of a preferred embodiment of the present invention.
Figure 2:
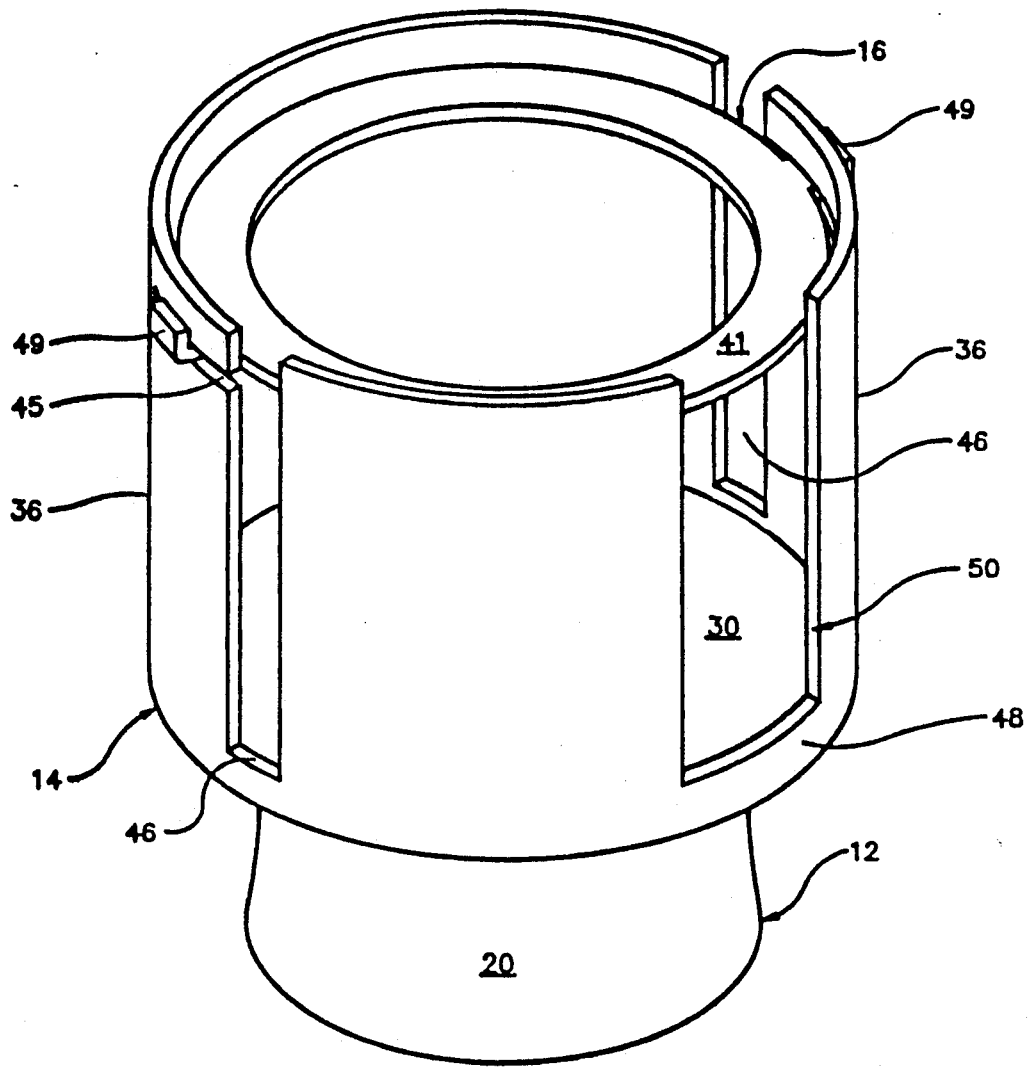
FIG. 2 is a perspective view as in FIG. 1 but with the inner adapter ring raised to an active position.
Figure 3:
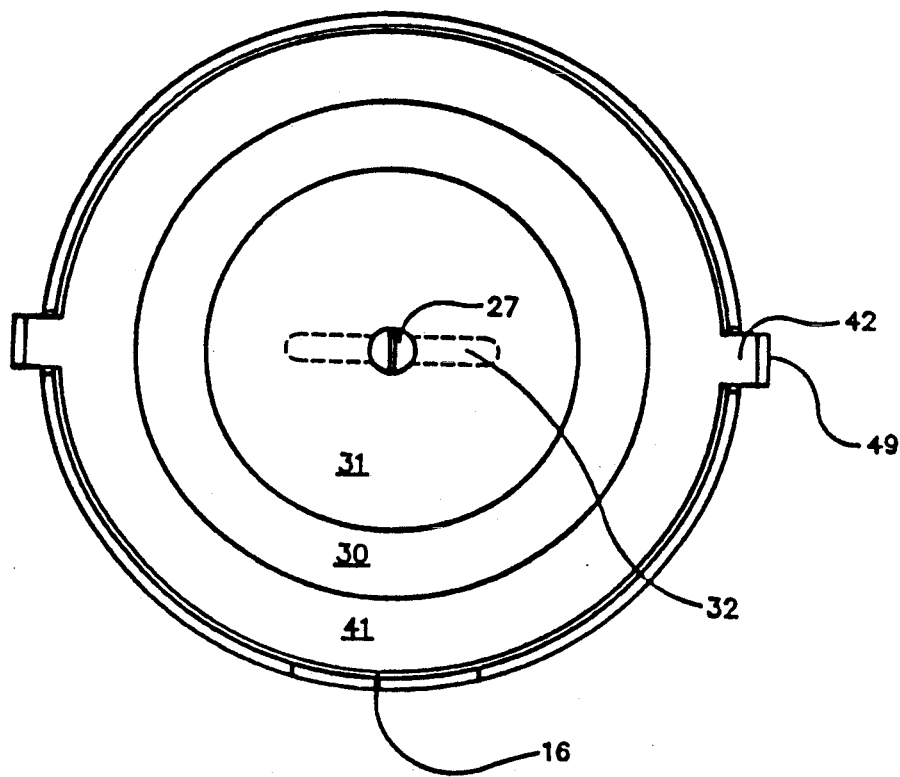
FIG. 3 is a plan view taken from the top.

FIGS. 1-4 illustrate what is considered to be the preferred embodiment of the present invention 10. The basic components of cup holder 10 are a base member 12, an upper cup-receiving socket 14, and a socket adapter ring 16.

The base member 12 is a substantially tubular, but with slightly concave outer surface configuration of side walls 20 and a closed upper end 22. Preferably the base 12 is formed of a heavy weight rubber or rubber-like material having a cross-sectional thickness of approximately one-quarter inch providing a firm supporting under surface 24. The base 12 is of an outer diameter of two to three inches with the preferred being approximately two and a half inches to fit securely in the relatively standardized, stationary cup holders of most vehicles.

Figure 4:
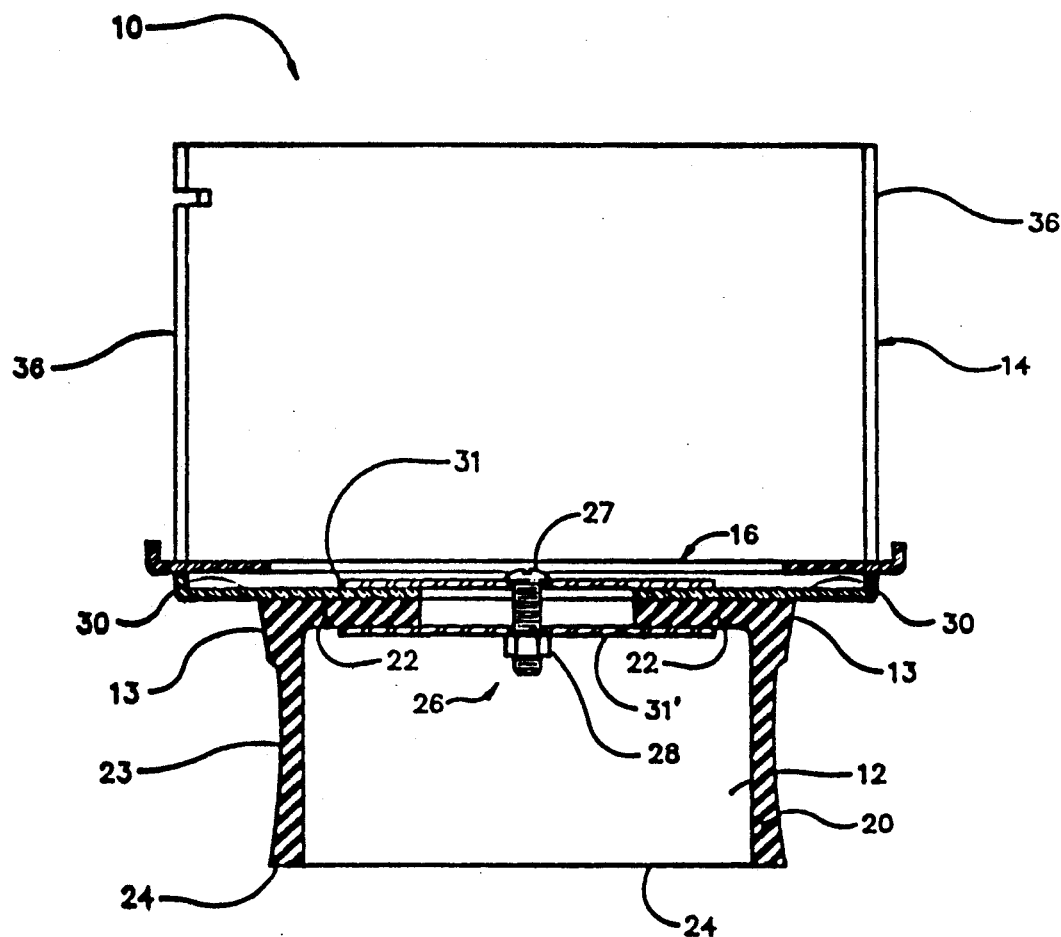
FIG. 4 is a cross-sectional view taken along lines IV—IV of FIG. 1.

As best shown in FIG. 4, the base has an annular rim 13 around the upper surface thereof, and a very slight concavity 23 just below the rim 13. This outer configuration improves stability of the entire unit 10, and improves the fit of the base within existing cup holders of various sizes. The cross-sectional thickness of outer walls 20 is seen to be increased at the top rim 13 and the bottom surface 24, with a decreased thickness at concavity 23.

Use of rubber or a synthetic rubber-like material allows for Some flexibility of the sidewalls 20, thereby fitting somewhat snugly into the receiving cup holder. Additionally, the rubber material provides some friction or traction-like effect against the inner walls of the receiving cup holder, reducing the likelihood of it tilting out. Further, the rubber material tends to dampen noise created by the slipping of adjacent surfaces sometimes caused by vehicle movement.

The cup-receiving upper socket 14 is an enlarged cylindrical member mounted to the outer surface of the closed upper end 22 of the base 12. Socket 14 is preferably formed of a relatively thin, but durable and rigid, molded plastic. Use of a thin material maximizes the functional internal diameter of the cup holder; and use of a molded plastic improves durability and reduces production costs.

Upper socket 14 is attached to the upper surface of the base 12 by means of a nut and bolt fastener means 26 which extends parallel to the vertical axis of base 12. Fastener means 26 is comprised of a flat head bolt 27 which extends through the closed floor 30 of the socket and through closed end 22 of the base, and is secured by a nut 28 accessible through the open interior of the base 12. The floor 30 of the socket includes an elongated slot 32 in the mid-portion thereof, through which the bolt 27 is inserted. To adjust the lateral position of the socket 14, the fastener means 26 is loosened so that the socket can be moved from side-to-side, by means of adjusting the position of slot 32, relative to the center vertical axis of the base 12. Washer 31 and 31' lie on floor 30 and ceiling 22 respectively to increase the strength of the two surfaces and prevent wear.

The cup holding upper socket 14 is further comprised of sidewalls 36 extending upwardly perpendicular to floor 30 to a height of two and a half to three and a half inches and having an inner diameter of three to four inches. This approximate height and diameter has been found to receive and adequately support most large beverage cups.

In the interior of socket 14 is an adapter ring 40 used for adjusting the effective inner diameter of socket 14. When large cups are used the flat adapter ring 40 lies inactive on the floor 30 of the socket. When a smaller diameter cup or can is used, the ring is lifted up and seated in its active position.

The adapter ring 16 is comprised of a substantially flat, rigid ring-shaped flange 41 having an outer diameter only marginally less than the inner diameter of socket 14. The diameter of the center opening of flange 41 is two to three inches and accommodates standard beverage cups and cans. On the outer edges of adapter ring 40 are oppositely positioned ring-support tabs 42, approximately three-eights of an inch, used for lifting the adapter ring into an active position, whereby the tabs 42 are seated in slots 45 in sidewalls 36.

Slots 45 are horizontal slots positioned oppositely to each other on walls 36, intersecting with the upper portions of vertical slots 46. The tabs 42 lie inactively in the lowest point of slots 46. When ring 40 is needed, the slots 46 define a path of movement of tabs upwardly to the support slots 45. The ring 40 is then rotated clockwise for placement of tabs into slots 45.

The adapter ring 40 is of rigid, durable material such that it remains securely positioned. It functions, however, only to reduce the inner diameter of socket 14 and is not weight-bearing.

To accommodate a handle on a cup or coffee mug, a vertical notch 50, relatively wide, is positioned in one side of wall 36. This notch is not cut the full depth of wall 36, but rather is cut only to a point approximately one-fourth inch above the floor 30. This leaves a vertical lip member 48 extending upwardly. If liquid is accidentally spilled in socket 14, the lip 48 will contain the fluid in the socket and prevent spillage. Additionally, both tabs 42 include a slight vertical member 49 where connected to the flange 41 to form a lip for containing spilled fluids when the adapter ring 16 is inactive on the floor of the socket.

Other and further modifications may become apparent to those skilled in the art, it being understood that the description herein is illustrative only. The scope of the invention is limited only by the claims below.

What is claimed is:

1. A beverage cup holder of the type adapted to accommodate cups and mugs of various diameters; said cup holder including:
   A) a base member having a substantially tubular shape and being of a prescribed height and outer diameter;
   B) an upper socket member of substantially cylindrical configuration, having sidewalls of prescribed height, and a floor and said socket having a prescribed inner diameter; said socket member being attached to said base member, and including means for adjusting the position of said socket member laterally, relative to the vertical axis of said base member;
   C) an adapter ring for reducing the effective inner diameter of said socket member; said adapter ring being retained in said socket member and movable between a first inactive position on the floor of said socket member, and a second, active position whereby said adapter ring is raised upwardly in said socket to hold small beverage containers;
   D) means for retaining said adapter ring in said second, raised position;
whereby said base member is inserted in an existing cup holder and retained therein to accommodate larger beverage containers.

2. A cup holder according to claim 1 and further including said base member being made from a heavy weight rubber material, and said base member having a closed upper end.

3. A cup holder according to claim 1 wherein said adapter ring is comprised of substantially flat, circular flange member having an outer diameter less than the inner diameter of said socket member, and a center opening having a prescribed inner diameter; said flange including on the outer edge thereof a pair of tabs extending outwardly, said tabs being positioned oppositely of each other, for use in moving said adapter ring between said first and second positions.

4. A cup holder according to claim 3 wherein said sidewalls of said socket member include a pair of vertically extending slots, one positioned oppositely the other, for receiving said adapter ring; said sidewalls further including a horizontal slot extending from one side of the upper end of each of said vertical slots, perpendicular thereto, for receiving said tbs and supporting said adapter ring in said second position.

5. A cup holder according to claim 1 wherein said sidewalls of said socket member include at least one vertically extending notch for accommodating a handle on a beverage cup.

6. A cup holder according to claim 1 wherein said means for adjusting the lateral position of said socket member comprises:
   A) said base member having a closed upper end;
   B) said socket member having a closed bottom floor, with said bottom floor including and elongated slot extending through, and a prescribed distance on either side of the center portion of said floor;
   C) a fastener means inserted through said slot in said bottom floor of said socket and into said closed top of said base, along the vertical center axis of said base, to connect said socket to said base;
whereby said socket may be laterally adjusted by loosening said fastener means and moving said socket in either direction relative to said vertical axis of said base.

* * * * *